(12) United States Patent
Paula et al.

(10) Patent No.: US 12,485,879 B2
(45) Date of Patent: Dec. 2, 2025

(54) METHOD FOR THE AT LEAST PARTIALLY AUTOMATED PARKING OF A MOTOR VEHICLE, DRIVER ASSISTANCE SYSTEM, AND MOTOR VEHICLE

(71) Applicants: AUDI AG, Ingolstadt (DE); CARIAD SE, Wolfsburg (DE)

(72) Inventors: Simone Paula, Rain (DE); Alejandra Castro Pena, Ingolstadt (DE); Alexander Hülsermann, Mühlheim an der Ruhr (DE); Philipp Kretschmann, Manching (DE); Michael Lübcke, Gaimersheim (DE)

(73) Assignees: Audi AG, Ingolstadt (DE); Cariad SE, Wolfsburg (DE)

( * ) Notice: Subject to any disclaimer, the term of this patent is extended or adjusted under 35 U.S.C. 154(b) by 153 days.

(21) Appl. No.: 18/262,554

(22) PCT Filed: Feb. 22, 2022

(86) PCT No.: PCT/EP2022/054324
§ 371 (c)(1),
(2) Date: Jul. 21, 2023

(87) PCT Pub. No.: WO2022/180005
PCT Pub. Date: Sep. 1, 2022

(65) Prior Publication Data
US 2024/0075921 A1 Mar. 7, 2024

(30) Foreign Application Priority Data
Feb. 23, 2021 (DE) .............. 10 2021 104 290.9

(51) Int. Cl.
*B60W 30/06* (2006.01)
*B60W 50/14* (2020.01)
*G01C 21/36* (2006.01)

(52) U.S. Cl.
CPC ............ *B60W 30/06* (2013.01); *B60W 50/14* (2013.01); *G01C 21/3676* (2013.01); *B60W 2420/403* (2013.01); *B60W 2556/40* (2020.02)

(58) Field of Classification Search
CPC ................. B60W 30/06; B60W 50/14; B60W 2420/403; B60W 2556/40; G01C 21/3676; B62D 15/0285
See application file for complete search history.

(56) References Cited

U.S. PATENT DOCUMENTS

2014/0354452 A1* 12/2014 Okuyama .............. G08G 1/143
340/932.2
2021/0046871 A1 2/2021 Lübcke
(Continued)

FOREIGN PATENT DOCUMENTS

DE 102013015348 A1 4/2014
DE 102013213225 A1 1/2015
(Continued)

OTHER PUBLICATIONS

International Search Report and Written Opinion, mailed Jun. 2, 2022, for International Patent Application No. PCT/EP2022/054324. (15 pages) (with English translation of International Search Report).

*Primary Examiner* — Ian Jen
*Assistant Examiner* — Renee LaRose
(74) *Attorney, Agent, or Firm* — Seed Intellectual Property Law Group LLP (57) ABSTRACT

A method and a system for the at least partially automated parking of a motor vehicle, wherein a trajectory is provided, the motor vehicle is driven in an at least partially automated manner along the trajectory, and the trajectory is displayed on a display device with an overview map of an environment. Furthermore, by at least one camera, environment regions of the environment are captured as respective image (Continued)

data, at least some of which are saved allocated to the related environment regions, wherein at the time of display of the overview map, all of the image data saved up until this point in time are displayed in corresponding display regions on the overview map.

13 Claims, 2 Drawing Sheets

(56) References Cited

U.S. PATENT DOCUMENTS

2021/0253134 A1 8/2021 Heimberger et al.
2022/0332349 A1* 10/2022 Benou ..................... G06T 7/50

FOREIGN PATENT DOCUMENTS

| DE | 102014016237 A1 | 6/2015 |
| DE | 102017115810 A1 | 1/2019 |
| DE | 102018102795 A1 | 8/2019 |
| DE | 102018207162 A1 | 11/2019 |
| EP | 3428032 A1 | 1/2019 |

* cited by examiner

METHOD FOR THE AT LEAST PARTIALLY AUTOMATED PARKING OF A MOTOR VEHICLE, DRIVER ASSISTANCE SYSTEM, AND MOTOR VEHICLE

BACKGROUND

Technical Field

The present disclosure relates to a method for the at least partially automated parking of a motor vehicle, and to a driver assistance system as well as a motor vehicle.

Description of the Related Art

The present disclosure mainly resides in the field of the so-called trained parking. The function of the trained parking allows a driver to teach a certain driving path, usually for a parking operation, in that he manually drives along it in a recording drive and subsequently saves it via the function. The saved parking operation can then be retrieved from any point of the recording, whereby the vehicle travels the route up to the end point in at least partially automated manner. In this context, at least partially automated means that the vehicle can independently drive along the trajectory and therein can take over both the steering and the acceleration and braking. However, it can additionally be required that the driver meanwhile has to actuate a kind of dead man's switch or at least should hold himself ready for intervening. In such an at least partially automated parking, thus, the motor vehicle can well automatically drive, i.e., both with respect to an automatic longitudinal and transverse guidance of the motor vehicle.

In this context, the document DE 10 2017 115 810 A1 describes a method for autonomously parking a vehicle based on a trajectory from a start point to a destination point, wherein the trajectory in a user interface and an environment region of the trajectory are presented and a drivable region in the environment region is determined and the trajectory is automatically adapted from the start point to the destination point considering the drivable region. Therein, a user can perform a corresponding input via the user interface to define a non-drivable or non-traversable region such as, for example, a flower bed or a lawn. The trajectory can be indicated by calculation or alternatively be learned in that the vehicle is maneuvered from the start point to the destination point by the driver, and the vehicle records the driven trajectory or the driving maneuver for driving the trajectory and subsequently reproduces it.

Furthermore, the document DE 2013 213 225 A1 describes a parking assistance system, in which a saved parking or routing maneuver along a trajectory is provided and the trajectory from a start position up to a destination position of the vehicle and environment objects are presented to the driver via a display device. Furthermore, an obstacle situated in front of the vehicle is displayed to the driver, wherein the driver instructs the parking assistance system by an input via an operating element how the obstacle is to be bypassed by the vehicle. Such an obstacle or generally environment objects can be suggestively presented to the driver on the display device. Then, the driver can decide how such an object is to be bypassed.

In the parking systems known heretofore, it is only possible to display such obstacles to the driver, which can be currently captured by a corresponding sensor technology of the motor vehicle. If the trajectory, along which it is to be driven, for example extends through hidden viewing ranges, for example around a building, thus, such objects can be displayed to the driver only very short-termed, namely only if the motor vehicle has driven as far as these objects are also in the capturing range of the sensor technology of the motor vehicle. But not only in collision avoidance, a representation of the environment around the trajectory as clear as possible plays a great role, but for example also in the selection of a suitable course of the trajectory itself. Even if a driver himself teaches the motor vehicle the trajectory to be driven in that he initially drives along it, thus, it is not always clear to a driver at this moment, such as with very long parking trajectories, if his driven trajectory is not unfavorably selected after all, and for example goes directly past a house entrance or another unfavorable location. The usually only suggestive outlining of captured environment objects in an overview map also does not always clearly indicate which objects they are, since only coarse outlines or the like are partially represented. Now, whether an object actually has been correctly classified as a non-traversable or traversable object, often is only poorly or not at all comprehensible for the driver based on such a coarse overview map.

BRIEF SUMMARY

Embodiments of the present disclosure provide a method, a driver assistance system, and a motor vehicle, which allow configuring the function of the at least partially automated parking of the motor vehicle as simple, clear, and safe as possible for a user.

In a method described herein for the at least partially automated parking of a motor vehicle, a trajectory from a start point to an end point is provided and saved, and in the event that the motor vehicle is in predetermined vicinity to the provided trajectory, the motor vehicle is driven along the trajectory up to the end point in at least partially automated manner, the trajectory is displayed on a display device, an overview map of an environment around the trajectory is displayed and the trajectory is represented in the overview map. Therein, the overview map comprises multiple different display regions, which correspond to respective environment regions of the environment of the trajectory, wherein, as soon as image data relating to the respective environment regions is captured by at least one camera of the motor vehicle, at least a part of the respective captured image data is saved as a current image data part (B, B1, B2, B3, B4, B5, B6, B7, B8) allocated to the respective concerned environment regions, and at the point of time of a display of the overview map, all of the current image data parts saved up to this point of time are displayed in the display regions of the overview map corresponding to the respective environment regions.

Embodiments of the present disclosure have at least two advantages: on the one hand, it is possible to not only schematically represent the environment of the motor vehicle in the overview map, but virtually as a real image capture of the environment since the image data captured by the at least one camera of the motor vehicle, optionally after conversion or processing, is displayed as such in the overview map. Similar to a top view camera image, thus, the environment around the trajectory, as far as image data is already present hereto, can be displayed to a user on the display device here too. By such a real image of the environment, which is composed or can be composed of parts of camera image captures, it is comprehensible for a user, which objects are arranged in the environment of the motor vehicle or in the vicinity of the trajectory or even on it, and where exactly in the environment the trajectory extends.

Advantageously, not only may currently capturable image data be displayed to a user therein but may also display what has already previously been captured, for example, when the motor vehicle still was in a very different position. One or more cameras of the motor vehicle may capture the environment while the motor vehicle moves on or in the vicinity of the trajectory. Therein, the motor vehicle currently does not necessarily have to be in the recording drive or in the at least partially automated parking. Generally, image data captured by the at least one camera of the motor vehicle, which relates to environment regions in the environment of the trajectory, can be captured at any time and saved to the respective environment regions and then be displayed at any time if the overview map is displayed for the purpose of the automated or partially automated parking. This overview map may be completed from time to time and environment regions may also be displayed in the overview map, which then cannot be captured at all from a current position of the motor vehicle by the sensor technology thereof. The driven route, for example, a yard entrance or a garage, may be recorded and assembled to an overview map by top view cameras of the motor vehicle in that one then draws the driven, saved driving path, which is presently referred to as trajectory, and makes it apparent to the user.

Even if this overview map cannot be completely filled in the recording drive and a display region is then displayed as a black rectangle, since image data is not yet present from the corresponding environment region, thus, this overview map, such as the black rectangle, can be further filled with camera images by driving through the remaining, not yet captured environment regions independently of the recording drive. Finally, a complete overview map can then be displayed to a user, which displays image information about a complete environment region around a provided trajectory from the start point thereof up to the end point. The driver may see the stored trajectory not only on a black background, but with direct relation to the real environment. Thus, it can be understood which path the vehicle will take or has taken in driving along the trajectory. One can make apparent which regions are drivable and configurable for the function, as explained in more detail below.

A completely automated or autonomous parking is able to be understood by an at least partially automated parking of the motor vehicle. During this partially automated or automated parking, the motor vehicle is may be able to autonomously drive from the start point or another start position in the vicinity of the trajectory up to the predetermined end point along the provided trajectory. Therein, at least the steering is automatically taken over by the motor vehicle, but also acceleration and/or deceleration of the motor vehicle. In some embodiments, the driver may take over monitoring tasks and optionally press a dead man's switch in the meantime.

A path curve from the start point to the end point is to be understood by a trajectory. The start and end points represent two respective spatial positions different from each other. The end point defines a parking position of the motor vehicle at the same time. Therein, at least stopping of the motor vehicle is to be understood by parking of the motor vehicle. In other words, the motor vehicle can drive along the trajectory up to the end point and stop there during the at least partially automated parking operation. In some embodiments, a parking brake or handbrake is also automatically actuated by the motor vehicle at the end point. In order to provide the trajectory, it can be taught by the driver. This means that the driver drives along the trajectory from the start point to the end point within the scope of a recording drive and thereby presets it to the motor vehicle. During this manual drive by the driver, the motor vehicle records the path curve, that is the trajectory, from the start point to the end point and saves it.

If the motor vehicle is subsequently again in predetermined vicinity to the provided trajectory, thus, the driver can initiate the at least partially automated parking and the motor vehicle automatically drives along the trajectory up to the preset end point of the trajectory caused thereby. Therein, in predetermined vicinity is to be understood such that the motor vehicle should not be located too far from the provided trajectory. Some embodiments provide, in the initial state, the motor vehicle already on the trajectory and at least largely oriented in a predetermined extension direction of the trajectory towards the end point. Even if the motor vehicle has a certain distance from the trajectory, which is in the range of a few meters, the motor vehicle may be adapted to automatically drive to the trajectory and to follow the trajectory up to the end point from there.

For example, if the motor vehicle is initially too far away from the provided trajectory, an indication may also be output to the driver to move closer to the provided trajectory. In some embodiments, the environment, which is displayed in the overview map, may represent the environment immediately adjoining to the trajectory. For example, a suitable section around the trajectory, which completely encompasses the trajectory, may be selected and displayed for displaying the overview map. According to length and geometric formation of the trajectory, the displayed environment region, that is the complete environment region, which is displayed, can correspondingly turn out larger or smaller. This environment region can in turn be divided into partial regions, which are presently referred to as environment regions of the environment of the trajectory. In principle, this division can be arbitrarily small, for example, also pixel-accurate related to the pixels provided by the display device. Therein, the geographic environment of the trajectory and the respective environment regions thereof are allocated to corresponding display regions in the overview map. Therein, the allocation maintains the spatial arrangement of the environment regions to each other. In other words, a position-accurate allocation exists between the environment regions and the display regions. As soon as image data is captured for a corresponding environment region of the environment of the trajectory, this image data, at least a part thereof, is saved, optionally processed and represented in the corresponding display region at the point of time of the display of the overview map.

In some embodiments, the environment regions are represented from a bird's eye perspective in the overview map. Thereby, the clarity may be considerably increased for a user. Therein, the image data capture can also be effected during the recording drive as well as during the automatic parking operation, as well as the display of the overview map. In other words, the overview map may also be live or real-time filled with currently captured image data, while the motor vehicle moves in the environment around the trajectory or on the trajectory. However, the point of time of the display may also be considerably later than the capture of the image data. That optionally only a part of the captured image data is also displayed, is to be understood such that certain image data is optionally not visible from the selected display perspective and either is not part of the display.

This is in turn caused in that the display perspective, from which the overview map is presented, does not necessarily correspond to the perspective, from which the motor vehicle camera has captured the corresponding environment region. In particular, not only one motor vehicle camera, but multiple motor vehicle cameras may be used for capturing the image data, which can be arranged distributed around the motor vehicle, for example, one at a vehicle front, one in the area of the vehicle rear, one at a respective side mirror of the motor vehicle, and/or one camera directed to the front at an interior mirror of the motor vehicle. The image data captured by these cameras can be fused and subjected to a perspective transformation and be projected to a desired projection plane for generating a bird's eye perspective. Thus, in order to represent the overview map from the bird's eye perspective, the images from the environment thus are not captured from the bird's eye perspective by a camera arranged above the motor vehicle, but by cameras in other positions, and the captured images are subsequently processed and fused such that the impression arises as if the resulting assembled image would have been captured by a camera arranged above the motor vehicle.

If the motor vehicle and correspondingly also the cameras move through the environment, thus, newly captured image data can simply be added to the existing environment image or be supplemented as new display regions. This approach is also referred to as matching and stitching. The filling of the regions, which thus have not been immediately captured, for example in the recording drive, can subsequently be effected via a matching and stitching together of the images based on image processing and/or based on GPS. This means that either by image analysis methods and/or based on captured position data, for example by GPS, it can be determined at which location in the overview map new image sections, which have been obtained from newly captured image data, are to be attached to existing image sections. Therein, the position correctness is to be maintained, which can be accomplished by said image analysis methods and/or in position-based manner. Therein, by stitching the images together, it is to be understood that transitions between display regions as smooth as possible, which are based on different captured images, are provided. Thereby, it can be achieved that an overview map is finally provided, which shows the environment of the trajectory from the bird's eye perspective, and which appears like a single image capture from this bird's eye perspective. Thus, it can be provided that if the motor vehicle is in a first position, first image data relating to a first environment region of the trajectory is captured by at least one camera of the motor vehicle, of which at least a part is saved, and at a determinable later point of time, at which the motor vehicle is in a second position different from the first one, is displayed on the display device in a first display region allocated to the first environment region.

In some embodiments, the display device may represent a display device of the motor vehicle. This is advantageous since the overview map can be presented on the display device in the motor vehicle to a user both during the recording drive and in executing the at least partially automated parking at the same time. However, it is also conceivable, in addition, that the overview map is displayed on a display device external to motor vehicle. This has the advantage that additional processing possibilities with respect to the overview map, the contents thereof and also with respect to the trajectory can be provided to a user, as explained in more detail below, and which the user can then perform on a computer device external to motor vehicle, for example, his mobile phone or a home computer or the like.

In some embodiments, a first image data part (B, B1, B2, B3, B4, B5, B6, B7, B8) of the saved current image data parts of a first environment region of the environment regions is updated if the at least one camera again captures current image data relating to the first environment region. This has the great advantage that changes in the environment of the trajectory can thus automatically also be captured and displayed. Thereby, a current environment image of the trajectory can always be made available to a user. Temporary obstacles and movable objects are also always live visible for a user during the use of the function. Hereby, the risk of accident or collision can be reduced to a minimum.

In one embodiment, an object, which has been captured by a capturing device of the motor vehicle in a certain environment region of the environment regions, is classified as drivable or non-drivable and the object with the classification associated with the object is displayed in the overview map in the display region allocated to the certain environment region. For capturing objects in the environment of the motor vehicle or in the environment of the trajectory, the at least one camera can also be used, by which the image data, which is displayed in the overview map, is also captured, and/or also other sensors associated with the motor vehicle. Such sensors can, for example, represent parking and ultrasonic sensors, respectively, further cameras or nano radars. Laser scanners and a lidar (Light Detection and Ranging) sensor, respectively, can also be used for environment capture. By such on-board sensors, the motor vehicle can easily measure the immediate vehicle environment and correspondingly classify it into the map, that is display captured objects in the form of the mentioned image data in the map and also the classification with respect to drivable or not associated with the object in addition to these displayed objects. Whether an object has been classified as drivable or non-drivable, can be effected by a corresponding marking of objects, which have been classified as non-drivable, by which these objects are characterized as obstacles. If objects are classified as drivable, they do not have to be explicitly marked as such in the overview map. An absent marking of these objects can be evaluated as a display of the classification thereof as traversable. This object display and classification does not necessarily have to be live effected. For example, the motor vehicle can capture the environment of the trajectory by the capturing device if the motor vehicle is in the vicinity of the trajectory. The captured objects including their classification can then be saved. If the overview map is displayed at a later point of time, thus, the captured objects and the classification results thereof can also be displayed associated therewith. Thereby, objects or obstacles can may also be marked in the overview map, which cannot be captured at all from the current position of the motor vehicle by a capturing device. This has advantages with respect to the planning of the trajectory or a replanning of the trajectory and allows a user to early intervene and to change the parking trajectory.

In one embodiment, if the certain environment region including the object is again captured, an update and/or plausibility check of a presence of the object and/or of the classification of the object are performed, wherein a result of the update and/or plausibility check is output. The captured objects can also be updated in a new drive. If some objects are movable objects such as a flower pot, garbage bins, a placed bicycle or the like, which are present in the vicinity of the trajectory or even on it at a point of time, but in turn not at another point of time, thus, this too can always be currently captured and displayed on the overview map. Thus, the user is always informed if any objects are currently present on the trajectory as obstacles or not. In some embodiments, a plausibility check of captured objects and of the classification thereof, respectively, may be performed based on newly captured image data or sensor data. For example, it can be that obstacles have been captured in different positions in captures at different points of time or different light conditions exist in captures at different points of time, which result in varying results with respect to the capture of an object and the classification thereof, respectively. If such contradictions occur in newly captured sensor data, the user can also be involved with respect to a decision of the update. Thereby, the reliability of displayed obstacles can be additionally increased.

In some embodiments, a correction of the classification of the object is performed depending on a user input. As previously described, the user can be involved in the decision of the update of objects and the classification thereof, respectively, to reliably configure the recognition of obstacles. However, the user therein cannot only be involved if a contradiction with respect to a capture of an object or the classification thereof has occurred after performing a plausibility check, but it can also be provided that the user has the possibility by a user input to basically correct objects classified by the system with respect to their classification. If an object is displayed as an obstacle in the overview map, although it is a traversable object, the user can communicate it to the system by his user input. The same also inversely applies, for example, if an object is represented in the overview map, but which is not marked as an obstacle. Then, the user can also communicate to the system that this object is an obstacle. For example, the user can mark regions in the overview map and classify them as obstacles, that is as non-traversable objects. Thereby, the environment capture can be further increased with respect to its reliability.

In some embodiments, the start point and/or the end point and/or a course of the trajectory are changed within a predetermined drivable region depending on a user input. In other words, the user can arbitrarily change the provided, saved trajectory, at least within a predetermined drivable region, by such a user input.

This has the advantage that the user does not again have to perform a recording drive to perform such a change in the provided trajectory. Therein, there is not only provided the possibility to the user to change the trajectory between the initially set start and end point, but also the start and/or end point of the trajectory itself. The user may also change the final parking position by changing the end point without having to perform a new recording drive. The adaptation of the trajectory via an operating medium by the driver allows an optimization of the recorded driving path—for example with respect to the driving path length or the desired end position. Compared to a purely schematic representation, one can also recognize obstacles in the overview, i.e., the overview map, with real images, which the on-board sensor technology has not captured. The user can perform such a user input using the overview map. For example, the overview map with the trajectory can be displayed on a touchscreen, i.e., a touch-sensitive screen, and the user has the possibility of arbitrarily changing the trajectory as well as the start point or end point thereof within a preset drivable region via a touch input. Thus, there may be the possibility of configuring the saved trajectory via an operating medium, for example, a touchscreen. Thus, the trajectory can be configured and shifted and adapted to a change of the environment. This can be effected both afterwards and live based on the overview display, that is the overview map, during the function use, that is during the at least partially automated parking operation. However, another input means, for example a mouse, arrow keys or the like, can also be provided, by which a pointing function is provided on the display device, on which the overview map with the trajectory is displayed, for example, to perform such a user input for changing the trajectory. This configuration is advantageous in combination with the real representation of the environment in the overview map, since hereby it can be visually conveyed to the user, which regions are drivable and which are not, and within which limits the trajectory is variable, and how its course can be reasonably modified. In contrast thereto, in case of a purely schematic environment representation with schematically drawn obstacles, the allocation of display regions to real environment regions would be considerably aggravated for a user, which would result in frequent incorrect plannings in the modification of the trajectory by the user.

In some embodiments, the overview map and/or the trajectory are transferred to a device external to motor vehicle by wireless communication, in particular to a central data processing device, for example, an Internet server and/or to another motor vehicle and/or to a mobile communication appliance.

This has the advantage that the scanned environment map in combination with the trajectory may be shared with others. It may be possible on the one hand to provide the overview map with the trajectory also on other communication appliances, for example, on a home computer or on a smartphone or the like. Thereby, the possibility may be given to the user, for example, to perform the described adaptation of the trajectory and/or corrections with respect to the classification of objects or the like at any location. Thus, the user does not have to be in the motor vehicle. In order to allow this, a suitable app may be provided, such as an application program executable on a computer device. Therein, the transfer of the overview map and/or of the trajectory may be effected via a central data processing device, such as an Internet server. In other words, the captured image data and/or the currently saved overview map with the currently saved trajectory may be transferred to such an Internet server and be retrieved from it from any other communication appliance. The retrieval of this data may be coupled to a corresponding credential, for example, a password or the like.

Numerous further possibilities of application may arise. For example, individual configuration possibilities may be conceivable for each capture, such as public, commercial, or private sharing, and the permission of changes in the saved routes. In addition, it is advantageous if the overview map and/or the trajectory are transferred to a another motor vehicle. Thus, such an overview map and/or the trajectory may also be used by other residents of the same household. By the possibility of sharing the capture, a household with multiple vehicles may pass a saved trajectory among each other. For example, a father can teach a parking maneuver for his son and transfer it to his vehicle. Thereby, the same region does not have to be driven multiple times. In addition, adaptations of the trajectory can be shared. Thus, a newly arranged flowerpot can be bypassed by a simple trajectory adaptation via the touchscreen, which can then be shared with other vehicles, which wish to perform the same parking operation. In principle, this allows for reacting to new circumstances, such as flowerpots on saved parking routes, and pictorially sharing these updates with other users. In the commercial area, it is conceivable that quasi perfect maneuvers are now sold or licensed, or the maneuvers are coupled to access mechanisms for parking garages.

Some embodiments include processing of the overview map and/or of the trajectory performed depending on a user input by a computing device external to the motor vehicle and a result of processing is transferred to the motor vehicle, wherein the display and/or the at least partially automated driving of the motor vehicle are executed depending on the transferred result of processing. Thus, a user can perform configurations from any location outside of the motor vehicle and transfer the results of this processing to his vehicle or also to other vehicles. Hereby, the operating comfort can be considerably increased.

Some embodiments also relate to a driver assistance system for at least partially automated parking of a motor vehicle, wherein the driver assistance system is adapted to save a provided trajectory from a start point to an end point, in the event that the motor vehicle is in predetermined vicinity to the provided trajectory, to drive the motor vehicle along the trajectory up to the end point in at least partially automated manner, to display the trajectory on a display device, to display an overview map of an environment around the trajectory and to represent the trajectory in the overview map. Therein, the overview map comprises multiple different display regions, which correspond to respective environment regions of the environment of the trajectory, wherein the driver assistance system is adapted, as soon as image data relating to the respective environment regions is captured by at least one camera of the motor vehicle, to save at least a part of the respective captured image data as a current image data part (B, B1, B2, B3, B4, B5, B6, B7, B8) allocated to the respective concerned environment regions and to display, at the point of time of a display of the overview map, all of the current image data parts saved up to this point of time in the display regions of the overview map corresponding to the respective environment regions. The advantages mentioned for the method described herein and its configurations similarly apply to the driver assistance system described herein.

Developments of the driver assistance system described herein, which comprise features, as they have already been described in context of the developments of the method described herein, also belong to the present disclosure. For this reason, the corresponding developments of the driver assistance system described herein are not again described here.

Some embodiments also relate to a motor vehicle with a driver assistance system described herein or one of its configurations.

The motor vehicle described herein may also be configured as a car, such as a passenger car or truck, a passenger bus, or a motorcycle.

The control device for the motor vehicle also belongs to the present disclosure. The control device may comprise a data processing device or a processor device, which is configured to perform the method described herein. In some embodiments, the processor device may comprise at least one microprocessor and/or at least one microcontroller and/or at least one FPGA (Field Programmable Gate Array) and/or at least one DSP (Digital Signal Processor). The processor device may comprise a program code, which is configured to perform the method described herein upon execution by the processor device. The program code can be stored in a data memory of the processor device.

The present disclosure may also include the combinations of the features of the described embodiments. Thus, the present disclosure may also include realizations, which each may comprise a combination of multiple features of the described embodiments, if the embodiments have not been described as mutually exclusive.

BRIEF DESCRIPTION OF THE SEVERAL VIEWS OF THE DRAWINGS

In the following, embodiments of the present disclosure are described.

DETAILED DESCRIPTION

Figure 1:
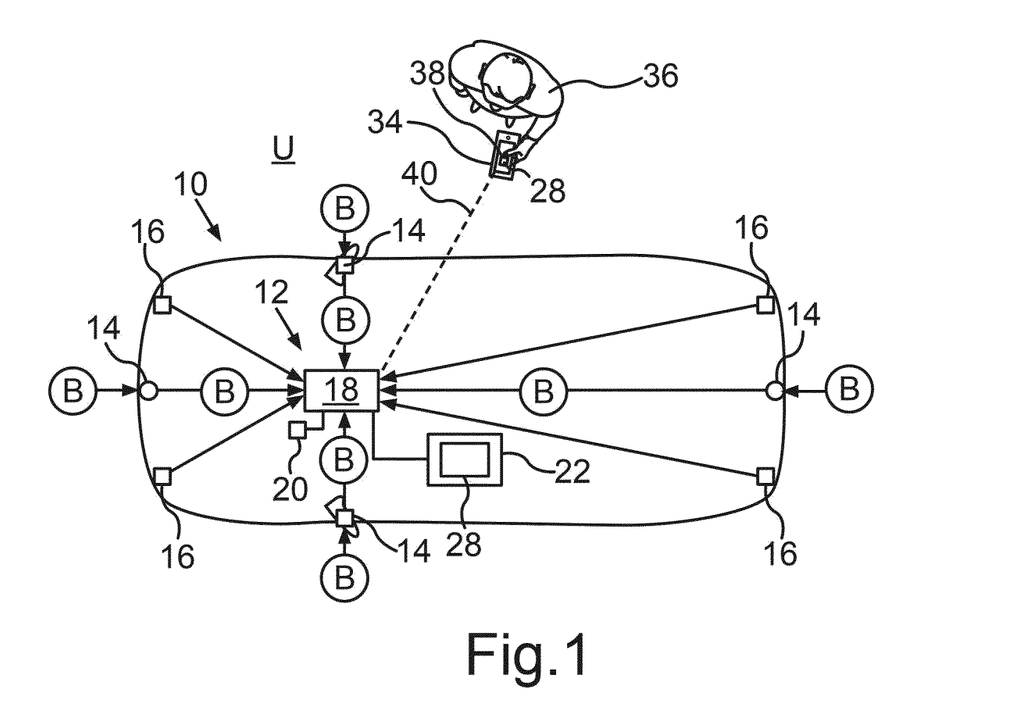
FIG. 1 is a schematic representation of a motor vehicle with a driver assistance system for trained parking.

FIG. 1 shows a schematic representation of a motor vehicle 10 with a driver assistance system 12 for trained parking. The driver assistance system 12 comprises at least one camera 14, four cameras 14 in the present embodiment, as well as optional further sensors 16 for capturing an environment U of the motor vehicle 10, which may be formed as parking sensors and ultrasonic sensors, respectively, or nano radars and/or laser scanners or the like. The cameras 14 are adapted to capture the environment U of the motor vehicle 10, such as in the form of image captures of the environment U, and to provide these image captures in the form of image data B to a control device 18 of the driver assistance system 12. The sensor data captured by the sensors 16, which is not explicitly illustrated here, is provided to the control device 18. The driver assistance system 12 also comprises a positioning device 20, for example, a GPS receiver. The driver assistance system 12 also includes a display device 22.

Figure 2:
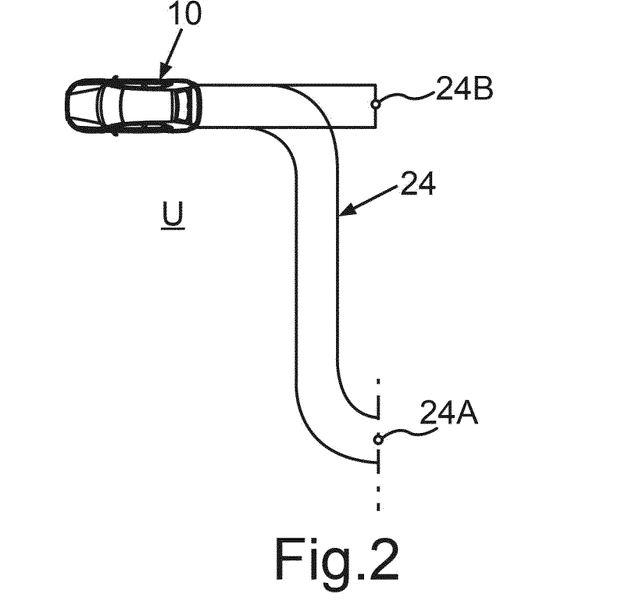
FIG. 2 is a schematic representation of the motor vehicle during a recording drive for recording a parking trajectory.

The function of trained parking, which is executable by the driver assistance system 12, allows the driver to teach a certain driving path, presently also referred to as trajectory 24 (for example compare FIG. 2), usually for a parking operation, in that the driver manually drives along the certain driving path in a recording drive and subsequently stores it via the function provided by the driver assistance system 12. For this purpose, the control device 18 can comprise a storage device. During the recording drive, the environment sensors 16 as well as the cameras 14 capture the environment U and the vehicle 10, or the control device 18 localizes the vehicle 10 based on the positions captured by the positioning device 20 during the recording drive. Thereby, the vehicle 10 or the control device 18 can localize the vehicle 10 in its environment U and also the route from a start point 24a up to an end point 24b traveled during the recording drive. This recording drive is illustrated in FIG. 2 in a top view to the motor vehicle 10 during this recording drive. If the motor vehicle 10 then moves again to the vicinity of this trajectory 24 at a later point of time, the stored parking operation can then be retrieved from this point. In other words, the stored parking operation can be retrieved from a point of the recording of the trajectory 24 or at least in the vicinity thereof, whereby the vehicle 10 travels the route up to the end point 24b in at least partially automated manner. Therein, the stored trajectory 24 can be represented in an overview map 28 on the display device 22 of the motor vehicle 10.

Some embodiments schematically provide such an overview map in that the trajectory is represented there, as well as obstacles captured by the motor vehicle sensors in the environment. Thereby, it may be difficult for a user to orient himself in the environment. Due to this schematic representation, such as of the obstacles, it is often difficult for a user to comprehend if they are non-traversable obstacles or if they optionally do not impair the desired trajectory at all. Inversely, only such objects in the environment of the motor vehicle are visible for a user in such a schematic representation, which have been recognized as obstacles by the vehicle. Other objects in the environment, which are categorized as traversable by the vehicle or the corresponding driver assistance system, usually would not be represented at all in such an overview map. For example, if a false assessment by the system is present and if an object is a non-traversable obstacle, which was erroneously classified as traversable, this is not immediately recognizable in the overview map for a user. This can bear high safety risks. Correspondingly, obstacles are often missed. It is also possible to represent the environment as top view image by assembling image captures. However, only live images can usually be displayed with such on-board top view cameras. Using the trained parking function, however, trajectories, for example, up to 50 meters of distance, may be planned and saved. Large environment regions of such a long trajectory are not captured at all by top view cameras, which only display the currently capturable environment. It may be very difficult to assess for a user if the route still to be driven of the remaining trajectory 24 up to the end point 24B is also drivable as planned, or if any obstacles must be bypassed after all, due to sudden changes in the environment. In each parking maneuver, this requires a very high concentration and attention of the user or of the driver, which impedes the comfort of the automatic parking operation. On the other hand, negligence or inattention of the driver during such an automatic parking operation often results in a collision with missed, non-traversable objects.

Some embodiments allow an overview map 28 on a display device, for example, the display device 22 of the motor vehicle 10, to a user, which was created based on the image data B captured by the cameras 14. Not only the environment regions of the environment U capturable at a current point of time can now be represented in the form of this image data B on the display device 22, but also image data B captured in previously performed drives or earlier points of time in the environment U of the trajectory 24. An overview map 28 may be provided, which shows the environment as a top view image not only in the immediate environment of the current position of the motor vehicle 10, but allows display of all of the environment regions around the complete trajectory 24. This is explained in more detail based on FIG. 3 and FIG. 4.

Figure 3:
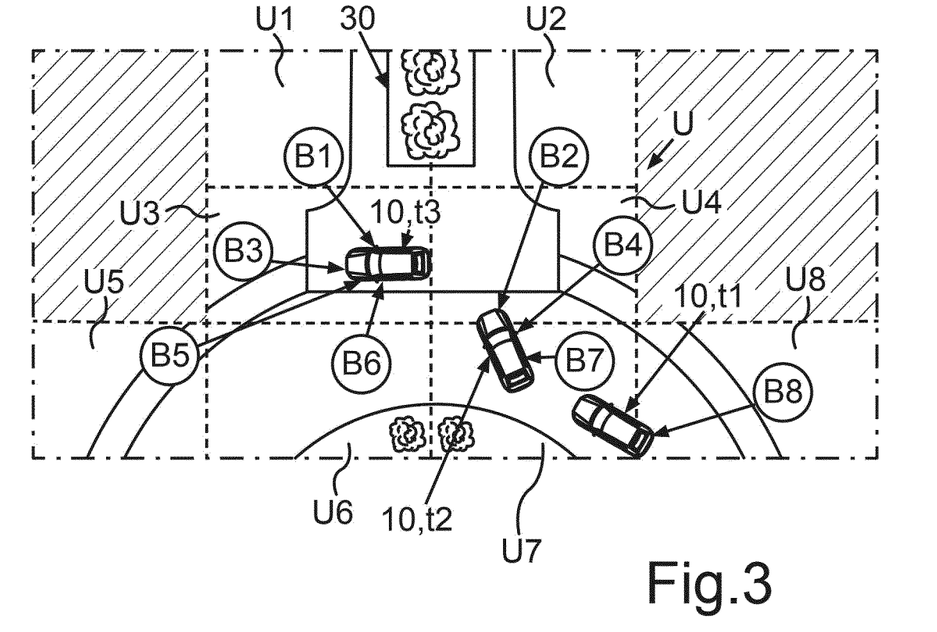
FIG. 3 is a schematic top view to the motor vehicle in multiple positions at different times in an environment of the trajectory.

FIG. 3 shows a schematic representation of the motor vehicle 10 at different times t1, t2, t3 in different positions in the environment U of the trajectory 24, which is not illustrated in FIG. 3 for reasons of clarity. The motor vehicle 10 can incidentally also be in the recording drive, that is it can be at these illustrated points of time that the trajectory 24 has not yet been completely recorded.

While the motor vehicle 10 moves in this environment U, the cameras 14 may capture the environment U of the motor vehicle 10 at these different times t1, t2, t3 in the form of image data. This environment region U is structured into individual environment regions U1, U2, U3, U4, U5, U6, U7, U8 for better illustration. The image data B captured by the cameras 14, corresponding to a respective environment region U1 to U8 is denoted by B1, B2, B3, B4, B5, B6, B7, B8. At a given time step, it is not required that all of the individual environment regions U1 to U8 are captured by the cameras 14 of the motor vehicle 10. They are only captured and saved in the course of the drive of the motor vehicle 10 through this environment region U. The motor vehicle 10 captures the environment regions U8 and U7 in the form of the corresponding image data B8, B7 in the first time step t1. In a later time step t2, the motor vehicle 10 captures the environment region U7 in the form of the image data B7 corresponding to this region, wherein this newly captured image data B7 may differ from the image data B7 previously captured in the first time step t1. The motor vehicle 10 also captures the environment regions U4, U2 in the form of the corresponding image data B4, B2 in the second time step t2. In the last illustrated time step t3, the motor vehicle 10 captures the environment regions U1, U3, U5 and U6 in the form of the corresponding image data B1, B3, B5, B6. In the course of the drive of the motor vehicle 10 through the environment U, all of the illustrated environment regions U1 to U8 are captured. It is an imaging capture by the cameras 14. However, objects in the environment U may also be captured by the other sensors 16 as explained in more detail below.

Figure 4:
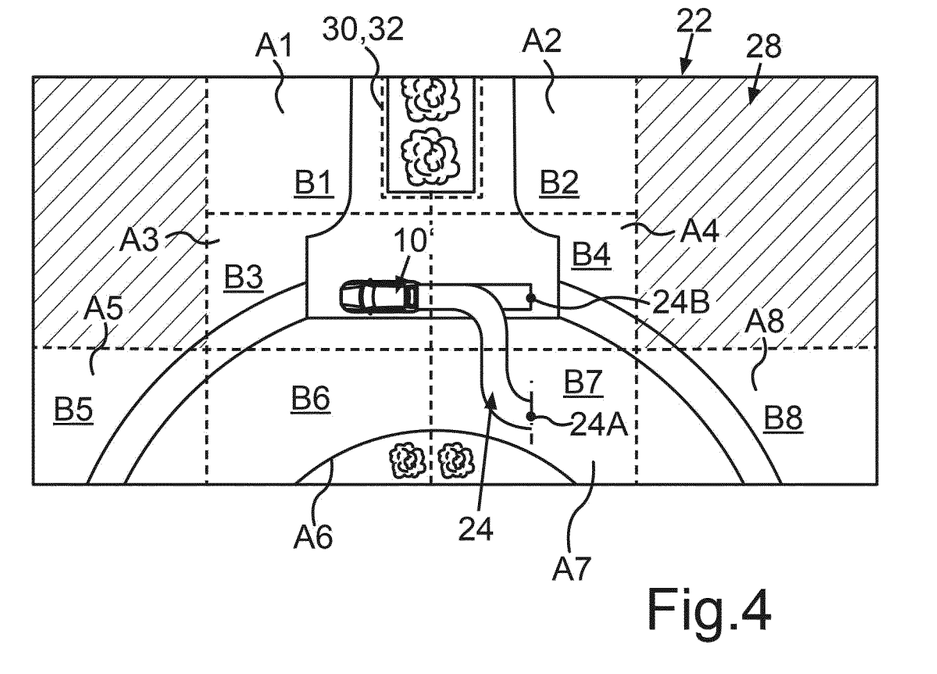
FIG. 4 is a schematic representation of the representation of an overview map with a trajectory displayed on a display device.

FIG. 4 shows a schematic representation of the overview map 28 represented on the display device 22. The provided trajectory 24 is represented in this overview map 28 on the one hand, a representation 10' of the current location of the motor vehicle 10, for example, in the form of a symbol or pictogram, as well as all of the environment regions U1 to U8 captured at the point of time of the display in the form of the corresponding image data B1 to B8 in display regions A1, A2, A3, A4, A5, A6, A7, A8 allocated to the respective environment regions U1 to U8. In FIG. 4, the display of the overview map 28 is effected at a point of time, at which thus all of the environment regions U1 to U8 have already been pictorially captured by the motor vehicle 10. Thus, the display point of time is later than the third point of time t3 illustrated in FIG. 3 or coincides with the third point of time t3. If a display would be provided earlier at the point of time t2, the corresponding images would be absent in the display areas A1, A3, A5 and A6 in the overview map 28 in the representation illustrated in FIG. 4. They could then be represented as black rectangles, on which the provided trajectory 24 is overlaid. The manual drive of the motor vehicle 10, for example, in the recording drive for trained parking, the driven route, for example, a yard entrance or garage, can be recorded in the form of the trajectory 24 by the top view cameras 14 and be assembled to an overview map 28, in which one draws the driven, saved driving path, that is the trajectory 24, and makes it visible to the user on the display device 22.

If this map is not yet completely filled in the recording drive, for example, if the map includes the described black rectangles with only images of the driven route 24, this overview map 28 may also be further filled with camera images independently of the recording drive by driving through the remaining not yet captured regions of the environment U. Thereby, the driver can see the saved trajectory 24 not only on a black background, but with direct relation to the real environment U. Thus, it can be clearly comprehended, which path the vehicle 10 will take or also has taken in driving along the trajectory 24. Then, it can be made evident, which regions are drivable and configurable for the function. The technology for representing the environment U and for assembling the images or image data B already partially exists in the current top view implementation. Thus, the black region around or below the vehicle 10 fills with images, which first are not recognized by cameras 14, as soon as the vehicle 10 moves and the respective region can be captured by the exterior cameras 14. This technology can be extended to completely illustrate an overview display 28 for the trained parking. Then, one can overlay the recorded driving path 24 on this display 28. The filling of the regions, which have not immediately been captured in the recording, can be subsequently effected via matching and stitching the images based on image processing and/or based on GPS. Therein, representation errors optionally occur, for example, captured objects in the environment seem higher than they actually are, since the real cameras view objects from the side and not from above. However, this does not impair the function of the overview map 28.

As already mentioned, the other on-board sensors 16, but also the cameras 14, can live measure the immediate vehicle environment U and classify it into the map 28. In other words, objects in the environment U of the motor vehicle 10 may also be captured and classified as traversable or non-traversable. In FIG. 3, the flower bed 30 was captured as such a non-traversable object. It may be represented with a corresponding marking 32 in the overview map 28, which is illustrated in FIG. 4. For example, the flower bed 30 may be highlighted in terms of color in the overview map 28 or with a frame or the like. In this manner, non-traversable objects 30, which have been captured by the vehicle 10, may also be displayed to the driver. In this map 28, regions may be displayed to the user, which have been classified as drivable or non-drivable by the on-board sensors 14, 16, because obstacles like walls or other objects have been recognized. In addition, this overview map 28 may be updated upon newly driving past the recorded locations in the environment U. An update of the map 28 may be effected by overwriting the old map 28.

Implausibilities may be captured via the sensors 14, 16, for example, in case of brightness differences or different objects. In case of implausibilities, for example, obstacles in different positions captures at different points of time or in different light conditions, the user may be involved with respect to a decision to the update. For updating the map 28, data of further users, which drive or have driven at this location, or of other media or sensors may also be used. Data of further users or sensors for updating the map 28 can be exchanged via vehicle-to-vehicle communication, over the air, or based on vehicle-to-infrastructure. An optimization on a server is also possible. The control device 18 of the driver assistance system 12, as illustrated in FIG. 1, may also be adapted to communicate with other appliances or communication devices, for example, other vehicles, an Internet server, or with a mobile communication appliance 34 of the user 36 in the present case. The control device 18 cannot only receive data such as the overview map 28 and/or the trajectory 24 described herein from other devices, but also transfer it to devices external to motor vehicle. In this example, the mobile communication appliance 34 associated with the user 36 may also comprise a display device 38, on which the overview map 28 can be displayed. This means, the overview map 28 with the trajectory 24 does not necessarily have to be displayed on the motor vehicle's own display device 22, but can alternatively be displayed on the display device 38 of a device 34 external to motor vehicle. This is advantageous in some embodiments if an adaptation of the trajectory 24 may be effected depending on a user input. For example, the adaptation of the trajectory can be allowed via an operating medium by the driver or the user 36. The saved trajectory 24 can be configured via an operating medium, for example, a touchscreen of the display device 22 or of the mobile communication appliance 34. Thus, the trajectory 24 may be corrected and shifted and the start point 24*a* and/or the end point 24*b* can also be changed. The trajectory 24 or the course may be adapted to optionally present changes of the environment U. This can be effected both afterwards, by the communication appliance 34 or another computing device external to the motor vehicle in comfortable manner, but also live based on the overview display 28 in the motor vehicle 10 during the function use.

Furthermore, it is conceivable that the scanned environment map 28 in combination with the trajectory 24 can be shared with others. For each capture, individual possibilities of configuration are conceivable, such as public, commercial, or private sharing or the permission of changes in the saved routes.

The configuration of the recorded driving path 24 may be effected via any operating and display media, for example, directly in the vehicle 10 via a touchscreen or other control elements like a display and a rotary push button, via a mobile appliance 34, which can access the data, or via a website with a mouse. The maps 28 can be shared, made plausible, and optimized on servers. A direct transfer V2V (vehicle-to-vehicle communication), for example, via Bluetooth, in particular BT LE (Bluetooth Low Energy) or WLAN (Wireless Local Area Network), is also possible. In the present example in FIG. 1, such a wireless communication is illustrated by the dashed line 40.

Overall, the examples show, how a driving path overview and a configuration menu for trained parking can be provided by the present disclosure, which the clarity and predictability for a user can be increased.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for at least partially automated parking of a motor vehicle, comprising:
   providing and saving a trajectory from a start point to an end point;
   in response to determining that the motor vehicle is in predetermined vicinity to the provided trajectory, driving the motor vehicle along the trajectory up to the end point in at least partially automated manner;
   displaying the trajectory on a display device;
   displaying an overview map of an environment around the trajectory;
   representing the trajectory in the overview map,
   wherein the overview map comprises multiple different display regions, which correspond to respective environment regions of the environment around the trajectory, wherein, as soon as image data relating to the respective environment regions is captured by at least one camera of the motor vehicle, at least a part of the respective captured image data is saved as a current image data part allocated to the respective concerned environment regions, and at the point of time of a display of the overview map, all of the current image data parts saved up to the point of time are displayed in the display regions of the overview map corresponding to the respective environment regions, and wherein, based on data from a capturing device of the motor vehicle, an object that has been captured by the capturing device in a certain environment region of the environment regions is classified as a first one of drivable and non-drivable;

transferring the overview map from the motor vehicle to a device external to the motor vehicle by wireless communication;

receiving a corrected overview map of the environment around the trajectory from the device external to the motor vehicle by wireless communication, wherein, in the corrected overview map of the environment around the trajectory, the object that has been captured by the capturing device in the certain environment region of the environment regions is classified as a second one of drivable and non-drivable that is different from the first one of drivable and non-drivable; and displaying the corrected overview map of the environment around the trajectory.

2. The method according to claim 1, wherein a first image data part of the saved current image data parts of a first environment region of the environment regions is updated if the at least one camera again captures current image data relating to the first environment region.

3. The method according to claim 1, wherein the object with the classification associated with the object is displayed in the overview map in the display region associated with the certain environment region.

4. The method according to claim 3, wherein if the certain environment region including the object is again captured, an update and/or plausibility check of a presence of the object and/or of the classification of the object are performed, wherein a result of the update and/or plausibility check is output.

5. The method according to claim 3, wherein a correction of the classification of the object is performed depending on a user input.

6. The method according to claim 1, wherein the start point and/or the end point and/or a course of the trajectory are changed within a predetermined drivable region depending on a user input.

7. The method according to claim 1, wherein the overview map and the trajectory are transferred to the device external to the motor vehicle by wireless communication.

8. The method according to claim 1, wherein a processing of the overview map and/or of the trajectory is performed by a computing device external to the motor vehicle depending on a user input, and a result of processing is transferred to the motor vehicle, wherein the display and/or the at least partially automated driving of the motor vehicle are executed depending on the transferred result of processing.

9. A driver assistance system for at least partially automated parking of a motor vehicle, the driver assistance system comprising:

a processor; and a memory storing program code that, when executed by the processor, causes the driver assistance system to:

save a provided trajectory from a start point to an end point;

in response to determining that the motor vehicle is in predetermined vicinity to the provided trajectory, drive the motor vehicle along the trajectory up to the end point in at least partially automated manner;

display the trajectory on a display device;

display an overview map of an environment around the trajectory; and represent the trajectory in the overview map; and wherein the overview map comprises multiple different display regions, which correspond to respective environment regions of the environment of the trajectory, wherein the driver assistance system is adapted, as soon as image data relating to the respective environment regions is captured by at least one camera of the motor vehicle, to save at least a part of the respective captured image data as a current image data part allocated to the respective concerned environment regions, and at the point of time of a display of the overview map, to display all of the current image data parts saved up to this point of time in the display regions of the overview map corresponding to the respective environment regions, and wherein, based on data from a capturing device of the motor vehicle, an object that has been captured by the capturing device in a certain environment region of the environment regions is classified as a first one of drivable and non-drivable, transfer the overview map from the motor vehicle to a device external to the motor vehicle by wireless communication;

receive a corrected overview map of the environment around the trajectory from the device external to the motor vehicle by wireless communication, wherein, in the corrected overview map of the environment around the trajectory, the object that has been captured by the capturing device in the certain environment region of the environment regions is classified as a second one of drivable and non-drivable that is different from the first one of drivable and non-drivable; and display the corrected overview map of the environment around the trajectory.

10. A motor vehicle with a driver assistance system according to claim 9.

11. The method according to claim 7, wherein the overview map and/or the trajectory are transferred to a central data processing device.

12. The method according to claim 7, wherein the overview map and/or the trajectory are transferred to another motor vehicle.

13. The method according to claim 7, wherein the overview map and/or the trajectory are transferred to a mobile communication appliance.

* * * * *